United States Patent
Chen et al.

(10) Patent No.: US 11,582,628 B2
(45) Date of Patent: Feb. 14, 2023

(54) DETECTING NETWORK COVERAGE HOLES AND SELECTIVE CLIENT STEERING

(71) Applicant: ARRIS Enterprises LLC, Suwanee, GA (US)

(72) Inventors: Wen Chen, San Jose, CA (US); Koteswar Rao Mellachervu, San Jose, CA (US); Raghavendra Sadaramachandra, Sunnyvale, CA (US)

(73) Assignee: Arms Enterprises LLC, Suwanee, GA (US)

( * ) Notice: Subject to any disclaimer, the term of this patent is extended or adjusted under 35 U.S.C. 154(b) by 132 days.

(21) Appl. No.: 17/122,059

(22) Filed: Dec. 15, 2020

(65) Prior Publication Data

US 2021/0211915 A1    Jul. 8, 2021

Related U.S. Application Data (60) Provisional application No. 62/958,673, filed on Jan. 8, 2020.

(51) Int. Cl.
| | | |
|---|---|---|
| *H04W 4/00* | (2018.01) | |
| *H04W 24/10* | (2009.01) | |
| *H04W 36/08* | (2009.01) | |
| *H04W 36/30* | (2009.01) | |
| *H04W 84/12* | (2009.01) | |

(52) U.S. Cl.
CPC ........... *H04W 24/10* (2013.01); *H04W 36/08* (2013.01); *H04W 36/30* (2013.01); *H04W 84/12* (2013.01)

(58) Field of Classification Search
CPC ..... H04W 24/10; H04W 36/08; H04W 36/30; H04W 84/12; H04W 24/08
USPC ......... 370/252–253, 400–402, 463, 419–421
See application file for complete search history.

(56) References Cited

U.S. PATENT DOCUMENTS

| | | | |
|---|---|---|---|
| 2008/0032727 A1 | 2/2008 | Stephenson et al. | |
| 2015/0052255 A1* | 2/2015 | Sun ...................... | H04W 76/18 709/227 |
| 2017/0026929 A1* | 1/2017 | Grischy ................ | H04W 24/10 |

(Continued)

OTHER PUBLICATIONS

Extended European Search Report, European Application No. 21150411.3, dated Jun. 9, 2021, 9 pages.

*Primary Examiner* — Thai D Hoang
(74) *Attorney, Agent, or Firm* — Steven Stupp; Stewart Wiener (57) ABSTRACT

During operation, an access point may determine, based at least in part on communication with the electronic device, that an electronic device is in a communication performance category. In response, the access point may provide one or more requests to one or more neighboring access points of the access point, where a given request is for an assessment of communication performance of the electronic device from a perspective of a given neighboring access point. Next, the access point may receive one or more reports associated with one or more neighboring access points with one or more assessments of the communication performance of the electronic device. When the one or more assessments indicate that superior communication performance is unavailable, the access point may provide a notification to a computer that indicates that the electronic device is in a coverage hole in a WLAN.

20 Claims, 5 Drawing Sheets

(56) References Cited

U.S. PATENT DOCUMENTS

2018/0359698 A1   12/2018  Patwardhan et al.
2020/0162889 A1*  5/2020  Desai ..................... H04W 8/24
2021/0352508 A1*  11/2021  Azarfar ................ H04W 76/19

* cited by examiner

DETECTING NETWORK COVERAGE HOLES AND SELECTIVE CLIENT STEERING

CROSS REFERENCE TO RELATED APPLICATIONS

This application claims priority under 35 U.S.C. 119(e) to U.S. Provisional Application Ser. No. 62/958,673, entitled "Detecting Network Coverage Holes and Selective Client Steering," by Wen Chen, et al., filed on Jan. 8, 2020, the contents of both of which are herein incorporated by reference.

This application is related to U.S. patent application Ser. No. 16/148,034, entitled "Dynamic Wireless-Client Distribution Across Radio Bands," by Wen Chen, Wenge Ren and Qingfeng Wang, filed on Oct. 1, 2018, and to U.S. patent application Ser. No. 16/148,118, entitled "Access-Point Discovery of Wireless-Network Topology," by Peter Khoury, filed on Oct. 1, 2018, the contents of both of which are herein incorporated by reference.

BACKGROUND

Field

The described embodiments relate to techniques for detecting coverage holes in a wireless local area network (WLAN) performing remedial action in response to such detection to improve communication performance.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

For example, in a WLAN that is compatible with an IEEE 802.11 standard, an electronic device (which is sometimes referred to as a 'client') may associate with an access point. Then, the electronic device may wirelessly communicate with the access point, which allows the electronic device to connect to a wired network, such as the Internet.

However, sometimes an electronic device may associate with an access point that has poor communication performance. This can result in low throughput, high latency and/or a high error rate, which is frustrating and degrades the user experience.

SUMMARY

An access point that detects a coverage hole in a WLAN is described. This access point includes an interface circuit that wirelessly communicates with an electronic device. During operation, the access point receives, at the interface circuit, one or more packets or frames associated with an electronic device. Then, the access point determines, based at least in part on communication of the one or more packets or frames, that the electronic device is in a communication performance category. In response, the access point provides, from the interface circuit, one or more requests addressed to one or more neighboring access points of the access point, where a given request is for an assessment of communication performance of the electronic device from a perspective of a given neighboring access point. Next, the access point receives, at the interface circuit, one or more reports associated with one or more neighboring access points with one or more assessments of the communication performance of the electronic device. When the one or more assessments indicate that none of the one or more neighboring access points have superior communication performance with the electronic device than the access point, the access point provides, from the interface circuit, a notification addressed to a computer that indicates that the electronic device is in the coverage hole in the WLAN.

Note that the determination may involve comparing a communication performance of the electronic device and a threshold value.

Moreover, the one or more requests may be compatible with an IEEE 802.11k standard.

Furthermore, the one or more reports may include one or more beacon reports.

Additionally, when one of the one or more assessments indicates that one of the one or more neighboring access points has superior communication performance with the electronic device than the access point, the access point provides, from the interface circuit, a recommendation addressed to the electronic device to transition to the one of the one or more neighboring access points. For example, the recommendation may include a basic service set (BSS) transition management (BTM) request.

In some embodiments, the computer includes a controller for the access point and the one or more neighboring access points in the WLAN.

Moreover, the one or more assessments may indicate that none of the one or more neighboring access points have superior communication performance with the electronic device than the access point when one or more received signal strengths (RSSIs) at the one or more neighboring access points relative to an RSSI of the access point is less than 20 dB.

Furthermore, the access point may compute a ranking of performance vectors for the one or more neighboring access points and the access point based at least in part on information included in the one or more assessments, where a given performance vector for a given access point in the one or more neighboring access points and the access point includes a product of an RSSI, a traffic capacity, and a packet error rate. For example, the product may include a cartesian or an inner product. Additionally, the access point may determine when none of the one or more neighboring access points have superior communication performance with the electronic device than the access point based at least in part on the ranking.

Another embodiment provides the computer. This computer may perform one or more counterpart operations to the aforementioned operations of the access point. For example, the computer may perform a remedial action to address the coverage hole.

Another embodiment provides a computer-readable storage medium for use with the access point. This computer-readable storage medium may include program instructions that, when executed by the access point, cause the access point to perform at least some of the aforementioned operations.

Another embodiment provides a method. This method includes at least some of the operations performed by the access point.

Another embodiment provides a communication system. This communication system may include access points, where a first access point in the access points includes an interface circuit that wirelessly receives packets or frames associated with an electronic device. Moreover, the communication system may include a computer. During operation, the communication system may: determine, based at least in part on the received packets or frames, that the electronic device is in a communication performance category from a perspective of the first access point; provide one or more requests addressed to one or more neighboring access points of the first access point, where a given request is for an assessment of communication performance of the electronic device from a perspective of a given neighboring access point; receive one or more reports associated with the one or more neighboring access points, where a given report comprises an assessment of the communication performance of the electronic device from the perspective of the given neighboring access point; and when the one or more assessments indicate that none of the one or more neighboring access points have superior communication performance with the electronic device than the first access point, determine that the electronic device is in a coverage hole in a WLAN.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An access point that detects a coverage hole in a WLAN is described. During operation, the access point may determine, based at least in part on communication with the electronic device, that an electronic device is in a communication performance category. In response, the access point may provide one or more requests to one or more neighboring access points of the access point, where a given request is for an assessment of communication performance of the electronic device from a perspective of a given neighboring access point. Next, the access point may receive one or more reports associated with one or more neighboring access points with one or more assessments of the communication performance of the electronic device. When the one or more assessments indicate that none of the one or more neighboring access points have superior communication performance with the electronic device than the access point, the access point may provide a notification to a computer that indicates that the electronic device is in the coverage hole in the WLAN.

By detecting a coverage hole in the WLAN, these communication techniques may allow appropriate corrective action to be taken. Notably, the computer may be a controller for the access point and the one or more neighboring access points in the WLAN. In response, to the notification, this controller may perform a remedial action to remove the coverage hole. For example, the controller may instruct at least one of the access point and the one or more neighboring access points to increase a transmit power. Alternatively or additionally, the controller may provide an alert to an operator of the WLAN, so that the operator can take corrective action. Consequently, the communication techniques may improve the communication performance in the WLAN and, thus, the user experience and customer satisfaction when communicating using the WLAN and/or using the electronic device.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth® (from the Bluetooth Special Interest Group of Kirkland, Wash.), and/or another type of wireless interface (such as another wireless-local-area-network interface). Moreover, an access point in the system may communicate with a controller or services using a wired communication protocol, such as a wired communication protocol that is compatible with an Institute of Electrical and Electronics Engineers (IEEE) 802.3 standard (which is sometimes referred to as 'Ethernet'), e.g., an Ethernet II standard. However, a wide variety of communication protocols may be used in the system, including wired and/or wireless communication. In the discussion that follows, Ethernet and Wi-Fi are used as illustrative examples.

Figure 1:
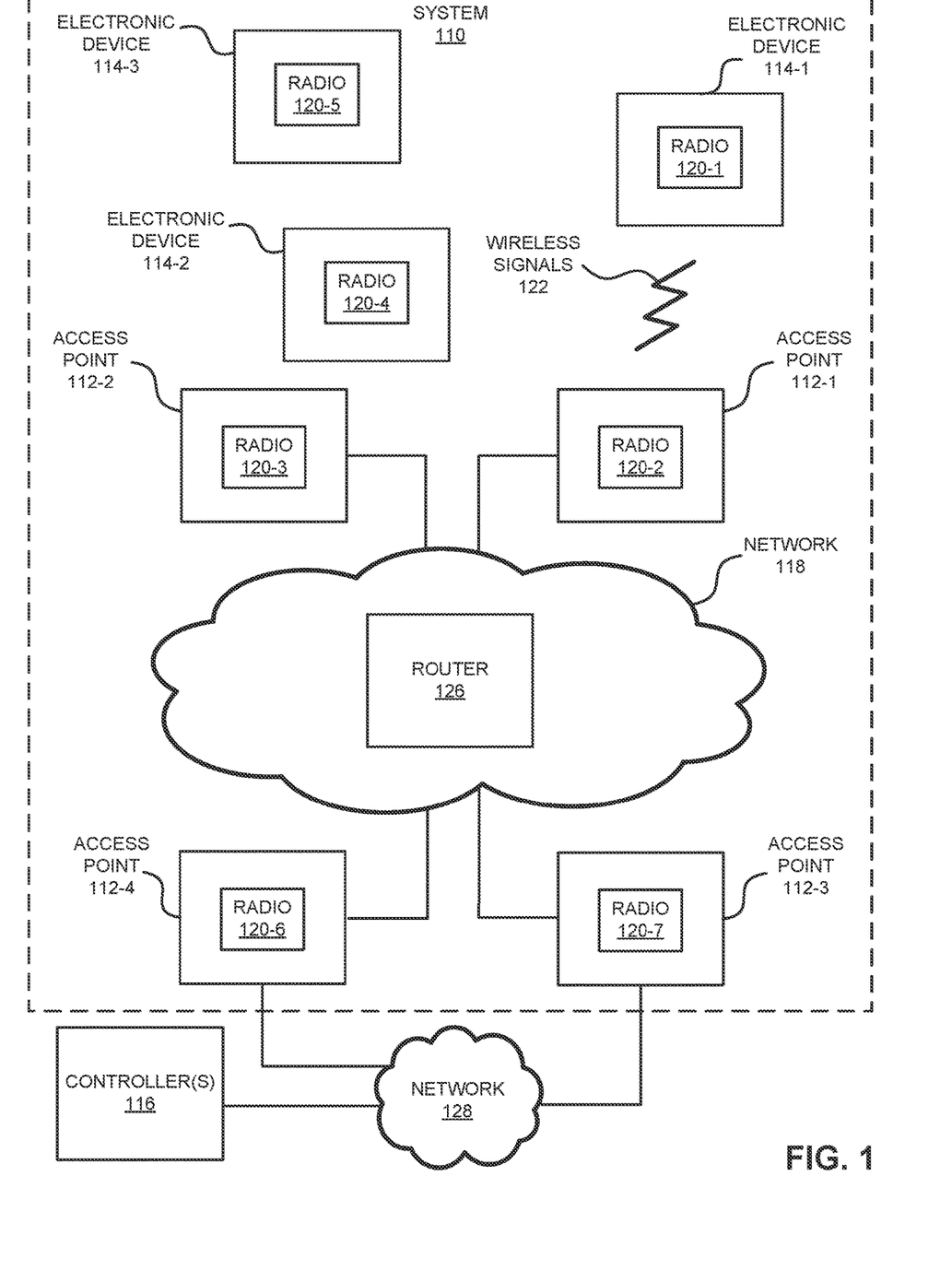
FIG. 1 is a block diagram illustrating an example of a system in accordance with an embodiment of the present disclosure.

We now describe some embodiments of the communication techniques. FIG. 1 presents a block diagram illustrating an example of a system 110, which may include components, such as: one or more access points 112, one or more electronic devices 114 (such as cellular telephones, stations, another type of electronic device, etc.), and one or more optional controllers 116. In system 110, the one or more access points 112 may wirelessly communicate with the one or more electronic devices 114 using wireless communication that is compatible with an IEEE 802.11 standard. Thus, the wireless communication may occur in a 2.4 GHz, a 5 GHz and/or a 60 GHz frequency band. (Note that IEEE 802.11ad communication over a 60 GHz frequency band is sometimes referred to as 'WiGig.' In the present discussion, these embodiments also encompassed by 'Wi-Fi.') However, a wide variety of frequency bands may be used.

Moreover, wired and/or wireless communication among access points 112 in a WLAN may occur via network 118 (such as an intra-net, a mesh network, point-to-point connections and/or the Internet) and may use a network communication protocol, such as Ethernet. This network may include one or more routers and/or switches, such as router 126.

As noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

In some embodiments, the wired and/or wireless communication among access points 112 also involves the use of dedicated connections, such as via a peer-to-peer (P2P) communication technique. Therefore, access points 112 may support wired communication within the WLAN (such as Ethernet) and wireless communication within the WLAN (such as Wi-Fi), and one or more of access points 112 may also support a wired communication protocol (such as Ethernet) for communicating via network 128 (such as the Internet) with other electronic devices, such as a computer or the one or more optional controllers 116 of the WLAN. Note that the one or more optional controllers 116 may be at the same location as the other components in system 110 or may be located remotely (i.e., at a different location). Moreover, note that the one or more access points 112 may be managed by the one or more optional controllers 116. Furthermore, note that the one or more access points 112 may be a physical access point or a virtual or 'software' access point that is implemented on a computer or an electronic device.

Figure 5:
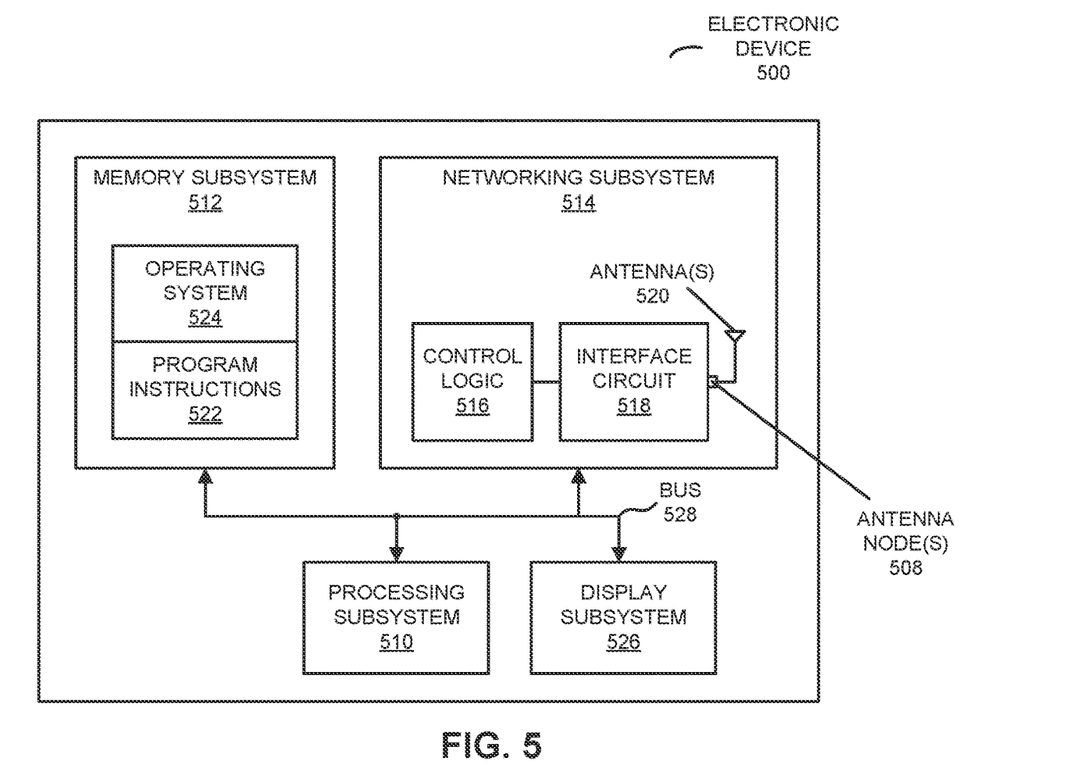
FIG. 5 is a block diagram illustrating an electronic device in accordance with an embodiment of the present disclosure.

As described further below with reference to FIG. 5, the one or more access points 112, the one or more electronic devices 114 and/or the one or more optional controllers 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-1 in electronic device 114-1. These wireless signals are received by radio 120-2 in at least one of the one or more access points 112, such as access point 112-1. Notably, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, one of electronic devices 114 (such as electronic device 114-1) may associate with one of access points 112 (such as access point 112-1). However, electronic device 114-1 may have poor communication performance with access point 112-1. For example, electronic device 114-1 may have low throughput, high latency and/or a high error rate when communicating with access point 112-1. Access point 112-1 may determine, based at least in part on communication with electronic device 114-1, that electronic device 114-1 is in a communication performance category (such as a category with poor communication performance). For example, access point 112-1 may compare a communication performance of electronic device 114-1 during communication on a channel with electronic device 114-1 and a threshold value.

Then, access point 112-1 may provide one or more requests to one or more neighboring access points (such as access point 112-2), where a given request is for an assessment of communication performance of electronic device 114-1 from a perspective of a given neighboring access point. For example, the one or more requests may be compatible with an IEEE 802.11k standard. In some embodiments, the one or more requests may be for station scan on the channel for the electronic device by the one or more neighboring access points.

Next, access point 112-1 may receive one or more reports (such as one or more beacon reports) associated with one or more neighboring access points with one or more assessments of the communication performance of electronic device 114-1. For example, when a neighboring access point can see or detect electronic device 114-1 on the channel, the neighboring access point may provide a report to the access point.

When the one or more assessments indicate that none of the one or more neighboring access points have superior communication performance with electronic device 114-1 than access point 112-1, access point 112-1 may provide a notification addressed to a computer (such as one of the one or more controllers 116) that indicates that electronic device 114-1 is in a coverage hole in a WLAN that includes access points 112. Alternatively, when one of the one or more assessments indicates that one of the one or more neighboring access points has superior communication performance with electronic device 114-1 than access point 112-1, access point 112-1 may provide a recommendation to electronic device 114-1 to transition to the one of the one or more neighboring access points. For example, the recommendation may include a BSS transition management request.

In some embodiments, access point 112-1 may compute a ranking of performance vectors for the one or more neighboring access points and access point 112-1 based at least in part on information included in the one or more assessments, where a given performance vector for a given access point in the one or more neighboring access points and access point 112-1 includes a product of an RSSI of electronic device 114-1, a traffic capacity associated with communication with electronic device 114-1, and a packet error rate associated with the communication with electronic device 114-1. For example, the product may include a cartesian or an inner product. Additionally, access point 112-1 may determine when none of the one or more neighboring access points have superior communication performance with electronic device 114-1 than access point 112-1 based at least in part on the ranking.

In this way, the communication techniques may detect a coverage hole in the WLAN and/or may selectively transition electronic devices 114 to different neighboring access points 112 with superior communication performance. This may allow appropriate remedial action to be taken, such as increasing a transmit power of at least one of access points 112. Therefore, communication techniques may improve the communication performance in system 110.

In the described embodiments, processing a frame or a packet in the electronic devices and/or the one or more access points may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114, and/or the one or more optional controllers 116. As another example, in another embodiment, different electronic devices are transmitting and/or receiving frames or packets.

Figure 2:
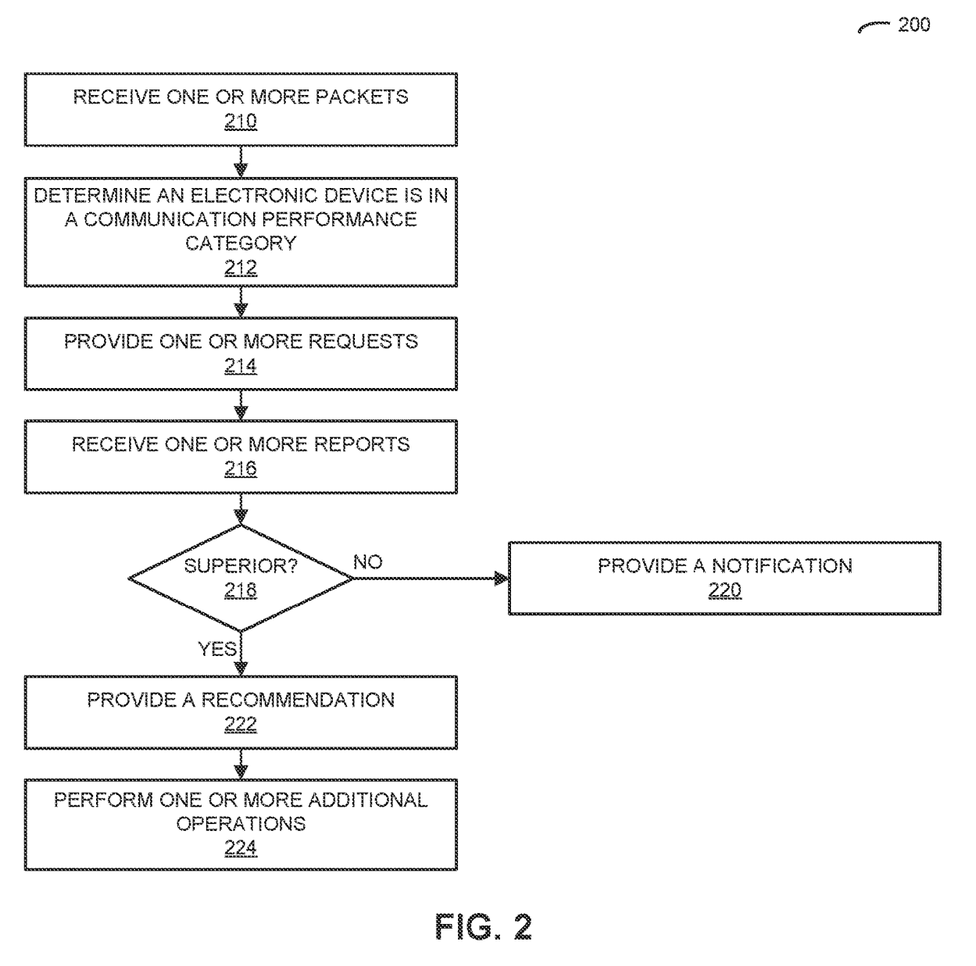
FIG. 2 is a flow diagram illustrating an example of a method for detecting a coverage hole in the system in FIG. 1 in accordance with an embodiment of the present disclosure.

We now describe embodiments of the method. FIG. 2 presents a flow diagram illustrating an example of a method 200 for detecting a coverage hole in a WLAN. Moreover, method 200 may be performed by an access point, such as one of the one or more access points 112 in FIG. 1, e.g., access point 112-1. During operation, the access point may receive, at an interface circuit, one or more packets (operation 210) or frames associated with an electronic device (which may be associated with the access point). Then, the access point may determine, based at least in part on communication of the one or more packets or frames, that the electronic device is in a communication performance category (operation 212). Note that the determination may involve comparing a communication performance of or associated with the electronic device and a threshold value. For example, when the communication performance is less than (or greater than) the threshold value, the electronic device may be in the communication performance category (such as when the RSSI is less than 15 dB in a 2.4 GHz band of frequencies and is less than 12.6 dB in a 5 GHz band of frequencies). In some embodiments, when an RRSI or a throughput of the electronic device is less than 5, 10 or 25% of a maximum RSSI or a maximum throughput, or when a packet error rate is greater than 75 or 90% of a maximum packet error rate, the electronic device may be in the communication performance category.

In response, the access point may provide, from the interface circuit, one or more requests (operation 214) addressed to one or more neighboring access points of the access point, where a given request is for an assessment of communication performance of the electronic device from a perspective of a given neighboring access point. Moreover, the one or more requests may be compatible with an IEEE 802.11k standard.

Next, the access point may receive, at the interface circuit, one or more reports (operation 216) associated with one or more neighboring access points with one or more assessments of the communication performance of the electronic device. Furthermore, the one or more reports may include one or more beacon reports.

When the one or more assessments indicate that none of the one or more neighboring access points have superior communication performance with the electronic device than the access point (operation 218), the access point may provide, from the interface circuit, a notification (operation 220) addressed to a computer that indicates that the electronic device is in a coverage hole in a WLAN. Note that the computer may include a controller for the access point and the one or more neighboring access points in the WLAN.

Alternatively, when one of the one or more assessments indicates that one of the one or more neighboring access points has superior communication performance with the electronic device than the access point (operation 218), the access point provides, from the interface circuit, a recommendation (operation 222) addressed to the electronic device to transition to the one of the one or more neighboring access points. For example, the recommendation may include a BSS transition management request. Alternatively, such as in embodiments where the electronic device does not support a BSS transition management request, the access point may send a de-authorization packet or frame to the electronic device.

In some embodiments, the electronic device optionally performs one or more additional operations (operation 224). For example, the one or more assessments may indicate that none of the one or more neighboring access points have superior communication performance with the electronic device than the access point when one or more RSSIs at the one or more neighboring access points relative to an RSSI of the access point is less than 15 dB.

Furthermore, the access point may compute a ranking of performance vectors for the one or more neighboring access points and the access point based at least in part on information included in the one or more assessments, where a given performance vector for a given access point in the one or more neighboring access points and the access point includes a product of an RSSI, a traffic capacity, and a packet error rate. For example, the product may include a cartesian or an inner product. Additionally, the access point may determine when none of the one or more neighboring access points have superior communication performance with the electronic device than the access point based at least in part on the ranking.

Additionally, in some embodiments, the access point may perform a remedial action when a coverage hole is detected. For example, the access point may: increase a transmit power when transmitting a packet or frame to the electronic device; use a different transmit antenna pattern (such as a more directional antenna pattern than an omnidirectional antenna pattern) when transmitting a packet or a frame to the electronic device; and/or use a different receive antenna pattern (such as a more directional antenna pattern than an omnidirectional antenna pattern) when receiving a packet or a frame from the electronic device. Note that the change to the transmit power, the transmit antenna pattern and/or the receive antenna pattern may be temporary (such as for a time interval, e.g., 1-3 min).

In some embodiments of method 200, there may be additional or fewer operations. Moreover, the order of the operations may be changed, and/or two or more operations may be combined into a single operation.

For example, while FIG. 2 illustrates the electronic device performing the operations in method 200, in other embodiments at least some of the operations in method 200 are performed by the computer. Notably, the access point may notify the computer when it determines that the electronic device is in the communication performance category, and the computer may provide the one or more requests and may receive the one or more reports. Furthermore, in some embodiments, the one or more requests are provided by the access point using unicast communication with the one or more neighboring access points. However, in other embodiments, a single request is broadcast by the access point to the one or more neighboring access points. Additionally, while method 200 was illustrated in the context of a WLAN, in other embodiments the communication techniques may be used with other types of wireless and/or wired networks.

Figure 3:
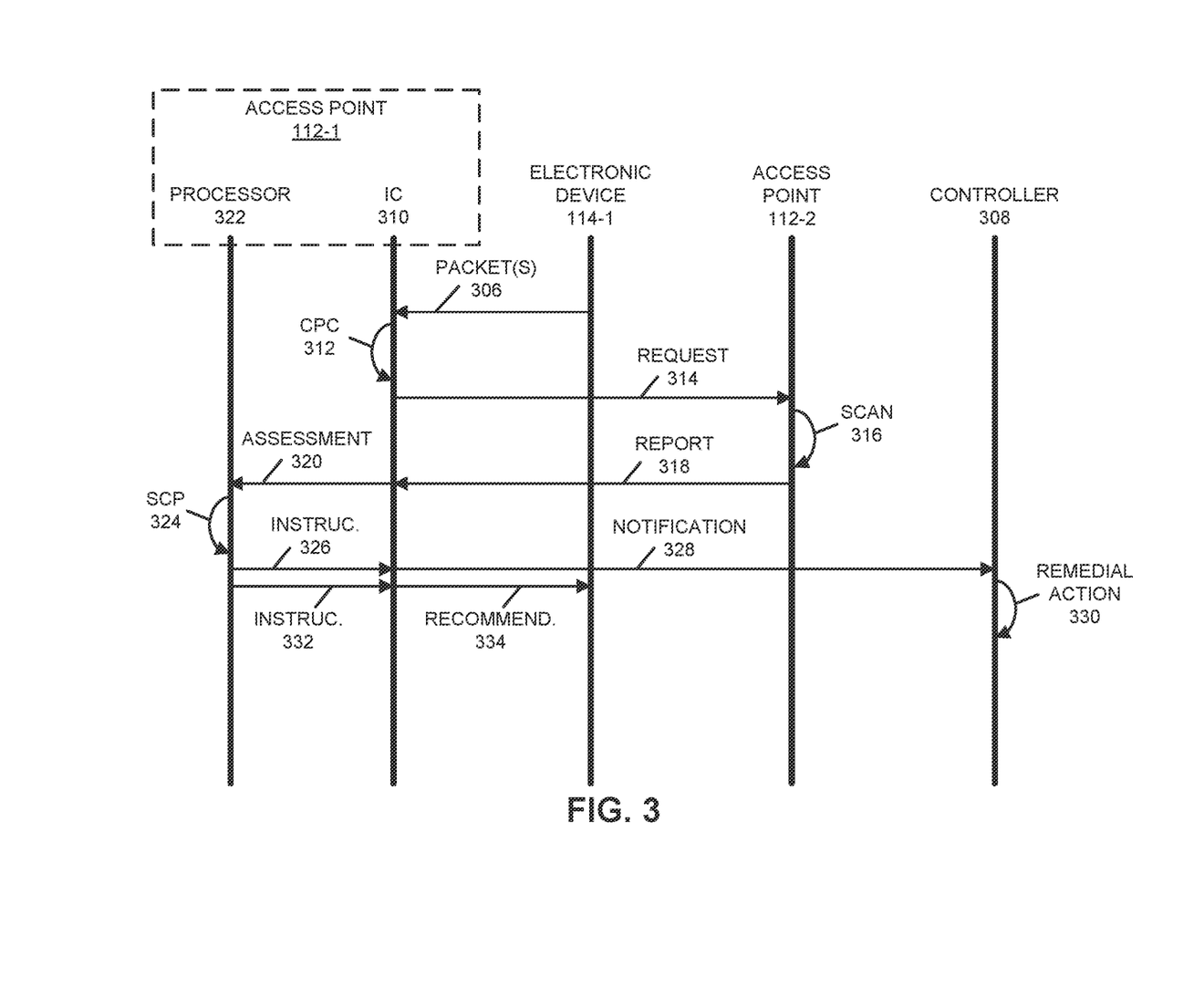
FIG. 3 is a drawing illustrating an example of communication among electronic devices in FIG. 1 in accordance with an embodiment of the present disclosure.

Embodiments of the communication techniques are further illustrated in FIG. 3, which presents a drawing illustrating an example of communication between access point 112-1, access point 112-2, electronic device 114-1 and controller 308 according to some embodiments. Notably, electronic device 114-1 may provide one or more packets 306 or frames to access point 112-1. An interface circuit (IC) 310 in access point 112-1 may receive the one or more packets 306 or frames. Then, interface circuit 310 may determine, based at least in part on communication of the one or more packets 306 or frames, that electronic device 114-1 is in a communication performance category (CPC) 312.

Moreover, when electronic device 114-1 is in the communication performance category, interface circuit 310 may provide a request 314 to at least a neighboring access point (such as access point 112-2) of access point 112-1, where request 314 is for an assessment of communication performance of electronic device 114-1 from a perspective of access point 112-2.

After receiving request 314, access point 112-2 may monitor or perform a scan 316 for electronic device 114-1, and then may provide a report 318 to access point 112-1. Note that report 318 may include an assessment 320 of the communication performance of electronic device 114-1 from the perspective of access point 112-2.

Furthermore, after receiving report 318, interface circuit 310 may provide assessment 320 to processor 322 in access point 112-1. Then, processor 322 may compute whether access point 112-2 has superior communication performance (SPC) 324 to access point 112-1. When this computation indicates that access point 112-2 does not have superior communication performance 324 with electronic device 114-1 than access point 112-1 (e.g., that electronic device 114-1 is in a coverage hole in a WLAN), processor 322 may provide an instruction 326 to interface circuit 310. In response to instruction 326, interface circuit 310 may provide a notification 328 to controller 308, which in response may perform a remedial action 330.

In the example shown in FIG. 3, it is assumed that access point 112-1 only has one neighboring access point, namely access point 112-2. It will be appreciated that if access point 112-1 has multiple neighboring access points, the operations labelled 306, 312, 314, 316, 318, 320 and 324 may be performed for each access point that is a neighbor of access point 112-1, and that operations 326, 328, 330 would be performed based on the assessments provided by all of the neighboring access points.

Alternatively, when assessment 320 indicates that access point 112-2 has superior communication performance 324 with electronic device 114-1 than access point 112-1, processor 322 may provide an instruction 332 to interface circuit 310. In response to instruction 332, interface circuit 310 may provide a recommendation 334 to electronic device 114-1 to transition to access point 112-2. If multiple neighboring access points have superior communication performance with electronic device 114-1 as compared to access point 112-1, then interface circuit 310 may provide a recommendation 334 to electronic device 114-1 to transition to the neighboring access point that has the best communication performance with electronic device 114-1 (such as the top-ranked neighboring access point).

While FIG. 3 illustrates communication between components using unidirectional or bidirectional communication with lines having single arrows or double arrows, in general the communication in a given operation in this figure may involve unidirectional or bidirectional communication.

Figure 4:
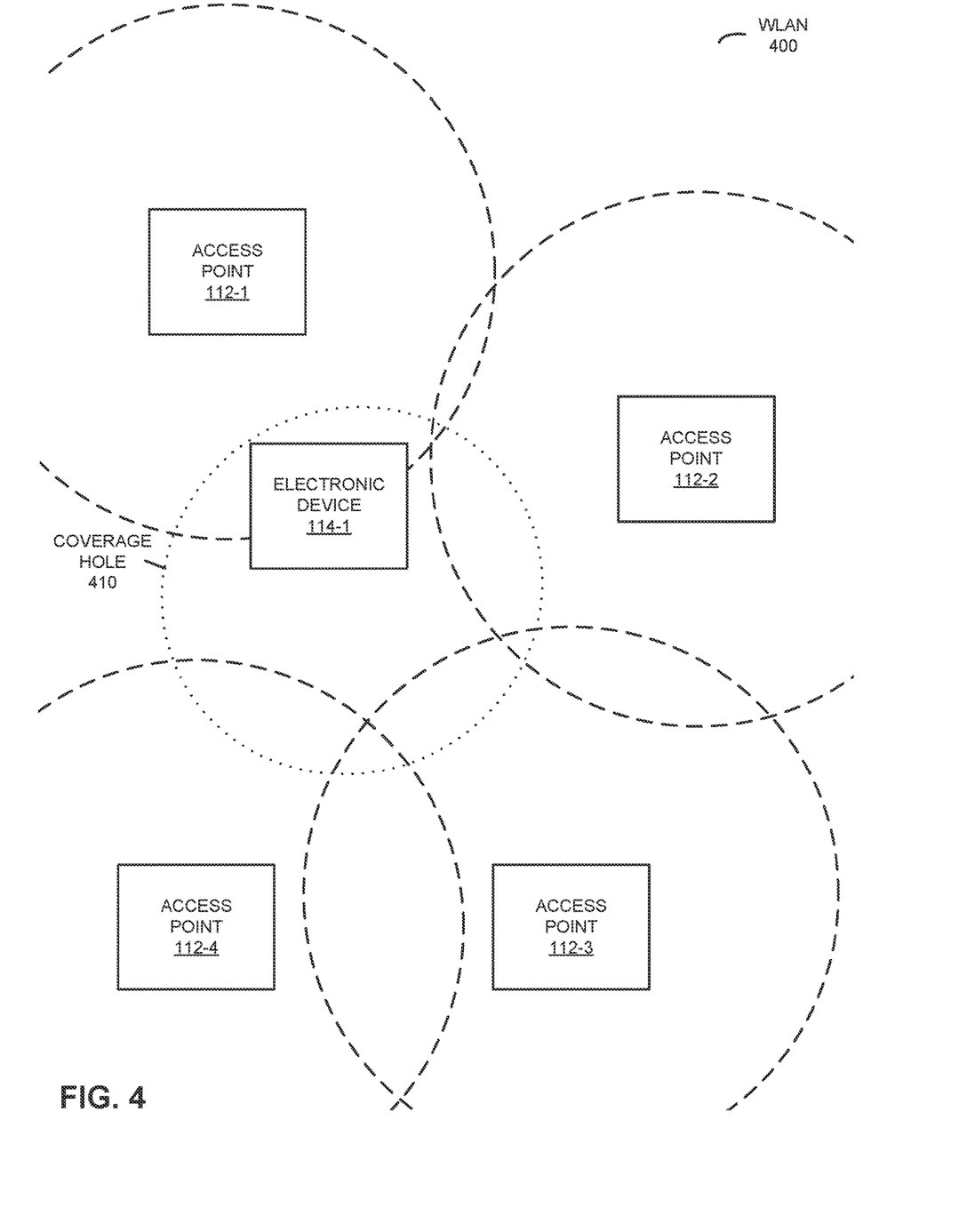
FIG. 4 is a drawing illustrating an example of a WLAN in accordance with an embodiment of the present disclosure.

These communication techniques are further illustrated in FIG. 4, which presents a drawing illustrating an example of a WLAN 400. In WLAN 400, access point 112-1 is associated with electronic device 114-1. Notably, access points 112 may have effective communication ranges illustrated by the dashed circles in FIG. 4. Based on communication between access point 112-1 and electronic device 114-1, and assessments of communication performance with electronic device 114-1 by access points 112-2, 112-3 and 112-4, access point 112-1 may determine whether electronic device 114-1 is in a coverage hole 410 in WLAN 400.

In some embodiments of the communication techniques, a client may be deemed to be in a coverage hole when it is associated with an access point having a low RSSI (such as, e.g., 15 dB in a 2.4 GHz band of frequencies or 12.6 dB in a 5 GHz band of frequencies) and does not have any other better options (i.e., another access point) in the radio-frequency neighborhood. Note, as described further below, in some embodiments, there may be a need to avoid a so-called 'sticky' client (in which a client that is steered to another access point, returns to an access point within a short time interval, and/or in which a client with poor communication performance does not roam to another access point) being identified as a client in coverage hole.

Coverage holes can occur in a variety of scenarios. For example, a coverage hole may occur with an access point at an edge of a network with a client connecting from a distance (such as from a parking lot, etc.). Alternatively, a coverage hole may occur when: an access point is installed behind a barrier; access points are deployed further apart; and/or auto cell sizing reduces the transmit power of one or more of the access points.

Using the communication techniques, an access point may: detect coverage holes in a WLAN due to deployment issues; detect sticky clients; report these clients to a controller or a cloud-based network analytic service; perform mitigation by increasing the transmit power, modifying a transmit antenna pattern and/or modifying the read sensitivity (such as by changing a receive antenna pattern).

When the access point detects a sticky client, the access point may steer the client (e.g., using a BTM request) to another access point with superior communication performance. Note that a sticky client may be an electronic device that: remains connected or associated with an access point (e.g., for more than 2 min); was recently steered from a neighboring access point; and/or has an RRSI with a current access point that is less than a neighboring access point. Moreover, if a BTM request fails, the access point may wait, e.g., at least 300 s, until another BTM request is provided to the client.

In some embodiments, such as those in which an electronic device is not compatible with IEEE 802.11v, the access point may send a de-authorization packet or frame to the electronic device.

In some embodiments of the communication techniques, the access point may collect communication performance information for the electronic device every 15 s and the assessments from neighboring access points every 60 s. These responses may be received asynchronously from the neighboring access points. Moreover, a notification about a sticky client or a coverage hole may be sent every 90 or 180 s. Furthermore, as discussed previously, when a coverage hole is detected, the access point or the controller may perform a remedial action.

Note that false detection of a coverage hole may occur on occasion. For example, false detection of a coverage hole may occur when an electronic device is not detected by all adjacent or neighboring access points. Alternatively or additionally, false detection may occur when an RSSI of an electronic device dips severely. Typically, RRSI can fluctuate by 0-15 dB. In the communication techniques, the threshold value and candidate neighboring access points may be selected to reduce or eliminate false detection of a coverage hole. Notably, the threshold value may be greater than the fluctuations or standard deviation in the communication performance (such as the RSSI). In some embodiments, candidate neighboring access points (which may receive the one or more requests) may be neighboring access points that are able to see or detect each other's wireless transmissions.

We now describe embodiments of an electronic device, which may perform at least some of the operations in the communication techniques. For example, the electronic device may include a component in system 110, such as one of: the one or more access points 112, the one or more electronic devices 114 and/or the one or more optional controllers 116. FIG. 5 presents a block diagram illustrating an electronic device 500 in accordance with some embodiments. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, graphical processor units (GPUs) and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory (which collectively or individually are sometimes referred to as a 'computer-readable storage medium'). In some embodiments, instructions for processing subsystem 510 in memory subsystem 512 include: one or more program modules or sets of instructions (such as program instructions 522 or operating system 524), which may be executed by processing subsystem 510. Note that the one or more computer programs may constitute a computer-program mechanism. Moreover, instructions in the various program instructions in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as nodes 508, e.g., a pad, which can be coupled to the one or more antennas 520. Thus, electronic device 500 may or may not include the one or more antennas 520.) For example, networking subsystem 514 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 500 may be adapted or changed using pattern shapers (such as reflectors) in one or more antennas 520 (or antenna elements), which can be independently and selectively electrically coupled to ground to steer the transmit antenna radiation pattern in different directions. Thus, if one or more antennas 520 includes N antenna-radiation-pattern shapers, the one or more antennas 520 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 4 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting frames and/or scanning for frames transmitted by other electronic devices.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, an access point, a transceiver, a controller, a radio node, a router, a switch, communication equipment, an access point, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program instructions 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 522, operating system 524 (such as a driver for interface circuit 518) or in firmware in interface circuit 518. Alternatively or additionally, at least some of the operations in the communication techniques may be implemented in a physical layer, such as hardware in interface circuit 518.

Moreover, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE.

In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
an interface circuit configured to wirelessly communicate with an electronic device, wherein the access point is configured to:
receive, at the interface circuit, one or more packets or frames associated with the electronic device;
determine, based at least in part on communication of the one or more packets or frames, that the electronic device is in a communication performance category;
provide, from the interface circuit, one or more requests addressed to one or more neighboring access points of the access point, wherein a given request is for an assessment of communication performance of the electronic device from a perspective of a given neighboring access point;
receive, at the interface circuit, one or more reports associated with one or more neighboring access points with one or more assessments of the communication performance of the electronic device;
compute a ranking of performance vectors for the one or more neighboring access points and the access point based at least in part on information included in the one or more assessments, wherein a given performance vector for a given access point in the one or more neighboring access points and the access point comprises a product of a receive signal strength indication (RSSI), a traffic capacity, and a packet error rate; and
when the ranking indicates that none of the one or more neighboring access points have superior communication performance with the electronic device than the access point, provide, from the interface circuit, a notification addressed to a computer that indicates that the electronic device is in a coverage hole in a wireless local area network (WLAN).

2. The access point of claim 1, wherein the access point is configured to determine that the electronic device is in a communication performance category by comparing a communication performance of the electronic device and a threshold value.

3. The access point of claim 1, wherein the one or more requests are compatible with an Institute of Electrical and Electronics Engineers (IEEE) 802.11k standard.

4. The access point of claim 3, wherein the one or more reports comprise one or more beacon reports.

5. The access point of claim 1, wherein, when one of the one or more assessments indicates that one of the one or more neighboring access points has superior communication performance with the electronic device than the access point, the access point is configured to provide, from the interface circuit, a recommendation addressed to the electronic device to transition to the one of the one or more neighboring access points.

6. The access point of claim 5, wherein the recommendation comprises a basic service set (BSS) transition management request.

7. The access point of claim 1, wherein the computer comprises a controller for the access point and the one or more neighboring access points in the WLAN.

8. The access point of claim 1, wherein the product comprises an inner product.

9. The access point of claim 1, wherein the access point determines when none of the one or more neighboring access points have superior communication performance with the electronic device than the access point based at least in part on the ranking.

10. A non-transitory computer-readable storage medium for use in conjunction with an access point, the computer-readable storage medium storing program instructions that, when executed by the access point, cause the access point to perform operations, comprising:
receiving, at an interface circuit, one or more packets or frames associated with an electronic device;
determining, based at least in part on communication of the one or more packets or frames, that the electronic device is in a communication performance category;
providing, from the interface circuit, one or more requests addressed to one or more neighboring access points of the access point, wherein a given request is for an assessment of communication performance of the electronic device from a perspective of a given neighboring access point;
receiving, at the interface circuit, one or more reports associated with one or more neighboring access points with one or more assessments of the communication performance of the electronic device;
computing a ranking of performance vectors for the one or more neighboring access points and the access point based at least in part on information included in the one or more assessments, wherein a given performance vector for a given access point in the one or more neighboring access points and the access point comprises a product of a receive signal strength indication (RSSI), a traffic capacity, and a packet error rate; and
when the ranking indicates that none of the one or more neighboring access points have superior communication performance with the electronic device than the access point, providing, from the interface circuit, a notification addressed to a computer that indicates that the electronic device is in a coverage hole in a wireless local area network (WLAN).

11. The non-transitory computer-readable storage medium of claim 10, wherein the determining comprises comparing a communication performance of the electronic device and a threshold value.

12. The non-transitory computer-readable storage medium of claim 10, wherein the one or more requests are compatible with an Institute of Electrical and Electronics Engineers (IEEE) 802.11k standard; and wherein the one or more reports comprise one or more beacon reports.

13. The non-transitory computer-readable storage medium of claim 10, wherein, when one of the one or more assessments indicates that one of the one or more neighboring access points has superior communication performance with the electronic device than the access point, the operations comprise providing, from the interface circuit, a recommendation addressed to the electronic device to transition to the one of the one or more neighboring access points.

14. The non-transitory computer-readable storage medium of claim 10, wherein the recommendation comprises a basic service set (BSS) transition management request.

15. The non-transitory computer-readable storage medium of claim 10, wherein the computer comprises a controller for the access point and the one or more neighboring access points in the WLAN.

16. A method for detecting a coverage hole in a wireless local area network (WLAN), comprising:

by an access point:

receiving, at an interface circuit, one or more packets or frames associated with an electronic device;

determining, based at least in part on communication of the one or more packets or frames, that the electronic device is in a communication performance category;

providing, from the interface circuit, one or more requests addressed to one or more neighboring access points of the access point, wherein a given request is for an assessment of communication performance of the electronic device from a perspective of a given neighboring access point;

receiving, at the interface circuit, one or more reports associated with one or more neighboring access points with one or more assessments of the communication performance of the electronic device;

computing a ranking of performance vectors for the one or more neighboring access points and the access point based at least in part on information included in the one or more assessments, wherein a given performance vector for a given access point in the one or more neighboring access points and the access point comprises a product of a receive signal strength indication (RSSI), a traffic capacity, and a packet error rate; and when the ranking indicates that none of the one or more neighboring access points have superior communication performance with the electronic device than the access point, providing, from the interface circuit, a notification addressed to a computer that indicates that the electronic device is in a coverage hole in a wireless local area network (WLAN).

17. The method of claim 16, wherein the one or more requests are compatible with an Institute of Electrical and Electronics Engineers (IEEE) 802.11k standard; and wherein the one or more reports comprise one or more beacon reports.

18. The method of claim 16, wherein, when one of the one or more assessments indicates that one of the one or more neighboring access points has superior communication performance with the electronic device than the access point, the method comprises providing, from the interface circuit, a recommendation addressed to the electronic device to transition to the one of the one or more neighboring access points.

19. The method of claim 18, wherein the recommendation comprises a basic service set (BSS) transition management request.

20. The method of claim 16, wherein the computer comprises a controller for the access point and the one or more neighboring access points in the WLAN.

* * * * *

UNITED STATES PATENT AND TRADEMARK OFFICE
CERTIFICATE OF CORRECTION

| | | |
|---|---|---|
| PATENT NO. | : 11,582,628 B2 | Page 1 of 1 |
| APPLICATION NO. | : 17/122059 | |
| DATED | : February 14, 2023 | |
| INVENTOR(S) | : Chen et al. | |

It is certified that error appears in the above-identified patent and that said Letters Patent is hereby corrected as shown below:

On the Title Page (73) Assignee: Please correct "Arms" to read --Arris--

Signed and Sealed this
Thirtieth Day of May, 2023

*Katherine Kelly Vidal*

Katherine Kelly Vidal
*Director of the United States Patent and Trademark Office*